(12) United States Patent
Aoki et al.

(10) Patent No.: US 8,400,518 B2
(45) Date of Patent: Mar. 19, 2013

(54) IMAGING APPARATUS (75) Inventors: Taizo Aoki, Hyogo (JP); Koji Hashigami, Osaka (JP)

(73) Assignee: Panasonic Corporation, Osaka (JP)

( * ) Notice: Subject to any disclaimer, the term of this patent is extended or adjusted under 35 U.S.C. 154(b) by 558 days.

(21) Appl. No.: 12/555,931

(22) Filed: Sep. 9, 2009

(65) Prior Publication Data
US 2010/0066853 A1 Mar. 18, 2010

(30) Foreign Application Priority Data

Sep. 10, 2008 (JP) ................................. 2008-231720

(51) Int. Cl.
*H04N 5/228* (2006.01)
(52) U.S. Cl. .............. 348/222.1; 348/221.1; 348/333.01
(58) Field of Classification Search ................ 348/221.1, 348/222.1, 333.01
See application file for complete search history.

(56) References Cited

U.S. PATENT DOCUMENTS

| | | | |
|---|---|---|---|
| 7,017,053 B2 * | 3/2006 | Mizuyabu et al. ............ | 713/300 |
| 2005/0046909 A1 * | 3/2005 | Kobayashi .................... | 358/474 |
| 2005/0052553 A1 * | 3/2005 | Kido et al. .................... | 348/296 |
| 2005/0157188 A1 | 7/2005 | Kubo | |
| 2006/0164533 A1 * | 7/2006 | Hsieh et al. ................... | 348/317 |
| 2007/0263077 A1 * | 11/2007 | Dhuey et al. ............... | 348/14.08 |

FOREIGN PATENT DOCUMENTS

| | | |
|---|---|---|
| JP | 6-350883 A | 12/1994 |
| JP | 9-172575 A | 6/1997 |
| JP | 2000-92380 A | 3/2000 |
| JP | 2005-210215 A | 8/2005 |
| JP | 2008-48215 A | 2/2008 |
| JP | 2008-79222 A | 4/2008 |

\* cited by examiner

*Primary Examiner* — Roberto Velez
*Assistant Examiner* — Yih-Sien Kao
(74) *Attorney, Agent, or Firm* — Panasonic Patent Center (57) ABSTRACT

An imaging apparatus includes an imaging unit; a display unit capable of displaying a moving image based on the image data generated by the imaging unit; a setting unit that receives setting of a user; a shutter operable to adjust an exposure time of the imaging unit according to a shutter speed; a determination unit operable to determine the shutter speed according to setting related to exposure set by user through the setting unit; and a controller operable to control the imaging unit and the display unit. The controller controls the imaging unit to be exposed for an exposure time corresponding to the shutter speed determined by the determination unit, and changes a frame rate of displaying the moving image on the display unit according to the determined shutter speed.

8 Claims, 6 Drawing Sheets

IMAGING APPARATUS

BACKGROUND

1. Technical Field

The technical field relates to an imaging apparatus such as a digital still camera and a digital video camera.

2. Related Art

JP-06-350883A discloses a camera that can change a photographing condition. Examples of the shooting condition include an aperture value, a shutter speed, a filter characteristic, and a film photosensitive characteristic. This camera allows the user with a viewfinder to confirm an image of which brightness is corrected according to the set shooting condition. Therefore, the user can confirm the brightness of the picture to be taken when the picture is actually taken, before the picture is taken.

Although the camera disclosed in JP-06-350883A allows the user to confirm the brightness of the picture to be obtained when the picture is actually taken, unfortunately the user hardly confirms the other shooting conditions.

SUMMARY

To solve the above object, an imaging apparatus is provided, which allows the user to previously confirm a picture to be generated when the picture is actually taken with adjusted conditions other than brightness of the picture.

In one aspect, an imaging apparatus includes: an imaging unit operable to be exposed to generate image data; a display unit capable of displaying a moving image based on the image data generated by the imaging unit; a setting unit that receives setting of a user; a shutter operable to adjust an exposure time of the imaging unit according to a shutter speed; a determination unit operable to determine the shutter speed according to setting related to exposure set by user through the setting unit; and a controller operable to control the imaging unit and the display unit. The controller controls the imaging unit such that the imaging unit is exposed for an exposure time corresponding to the shutter speed determined by the determination unit, and changes a frame rate of displaying the moving image on the display unit according to the determined shutter speed.

Accordingly, the an imaging apparatus in the above aspect can provide the imaging apparatus which allows the user to previously confirm a picture to be generated when the picture is actually taken with adjusted conditions other than the brightness of the picture.

DETAIL DESCRIPTION OF PREFERRED EMBODIMENTS

Preferred embodiments will be described below with reference to the accompanying drawings.

1. First Embodiment

1-1. Overview

In the following digital camera (imaging apparatus), a user can make settings such as an aperture value and a shutter speed. The digital camera can display an image generated based on the settings such as the aperture value and the shutter speed on a display monitor. Therefore, the user can roughly confirm what picture is taken before actually taking a picture.

1-2. Configuration

1-2-1. Block Diagram

Figure 1:
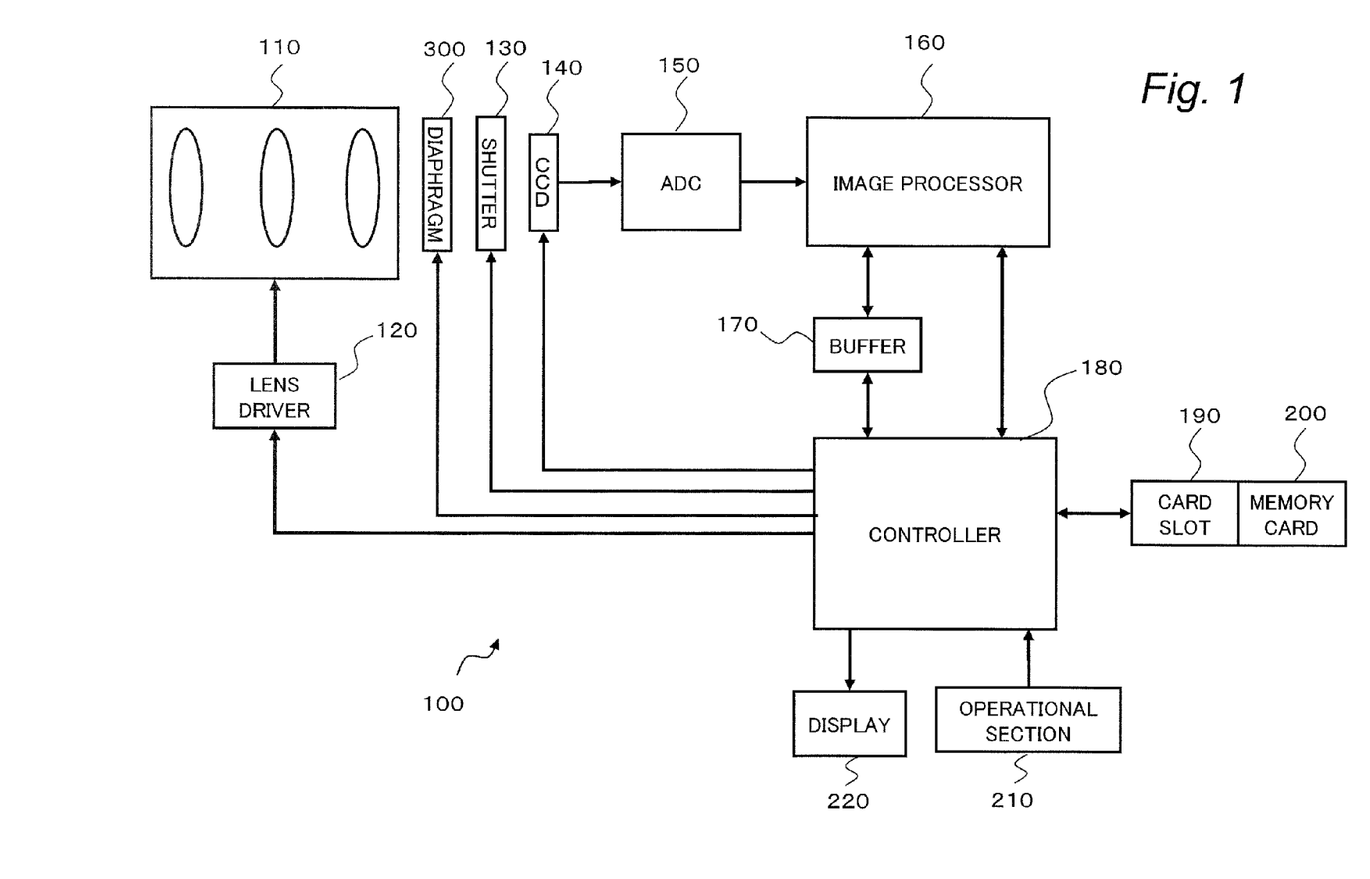
FIG. 1 is a block diagram showing a configuration of a digital camera according to a first embodiment.

A configuration of a digital camera according to a first embodiment will be described below. FIG. 1 is a block diagram showing the configuration of the digital camera of the first embodiment. The digital camera 100 captures a subject image formed by an optical system 110 which includes one or plural lenses with a CCD image sensor 140. Image data generated by the CCD image sensor 140 is subjected to various kinds of processing by an image processor 160 and is stored in a memory card 200. The detailed configuration of the digital camera 100 will be described below.

The optical system 110 includes a zoom lens and a focus lens. The subject image can be enlarged or reduced by moving the zoom lens along an optical axis. The subject image can be brought into focus by moving the focus lens along an optical axis.

A lens driver 120 drives various lenses included in the optical system 110. For example, the lens driver 120 includes a zoom motor that drives the zoom lens and/or a focus motor that drives the focus lens.

A diaphragm 300 is adjusted in a size of an opening according to the user setting or automatically to regulate a quantity of light passing through the diaphragm 300.

A shutter 130 is means for shutting out the light incident to the CCD image sensor 140. In the first embodiment, the shutter 130 includes a focal-plane shutter.

The CCD image sensor 140 captures the subject image formed by the optical system 110 to generate the image data. The COD image sensor 140 performs various operations such as exposure, transfer and electronic shutter.

An A/D converter 150 converts analog image data generated by the CCD image sensor 140 into digital image data.

The image processor 160 performs various kinds of processing to the image data that is generated by the CCD image sensor 140 and converted by the A/D converter 150. For example, the image processor 160 generates image data to be displayed on a display monitor 220 or image data to be stored in a memory card 200. Specifically, the image processor 160 performs various kinds of processing such as gamma correction, white balance correction, and flaw correction to the image data that is generated by the CCD image sensor 140 and converted into the digital data by the A/D converter 150. The image processor 160 compresses the image data based on a compression format according to a JPEG standard. The image processor 160 can be realized by a DSP (Digital Signal Processor) or a microcomputer.

The controller 180 is a control unit for controlling the whole of the digital camera 100. The controller 180 can be realized by a semiconductor device. The controller 180 may be implemented only by hardware or a combination of hardware and software. The controller 180 can be realized by a microcomputer.

A buffer 170 acts as work memories of the image processor 160 and controller 180. For example, the buffer 170 can be realized by a DRAM or a ferroelectric memory.

A card slot 190 can be loaded with the memory card 200 and can mechanically and electrically be connected to the memory card 200. The memory card 200 includes a flash memory or a ferroelectric memory, and can store an image file processed by the image processor 160.

An operation section 210 is a user interface that receives operations from the user. For example, the operation section 210 includes an arrow key and/or a set button that receives the operation from the user.

The display monitor 220 can display image of the image data generated by the CCD image sensor 140 or image of the image data read from the memory card 200.

1-2-2. Back Configuration

Figure 2:
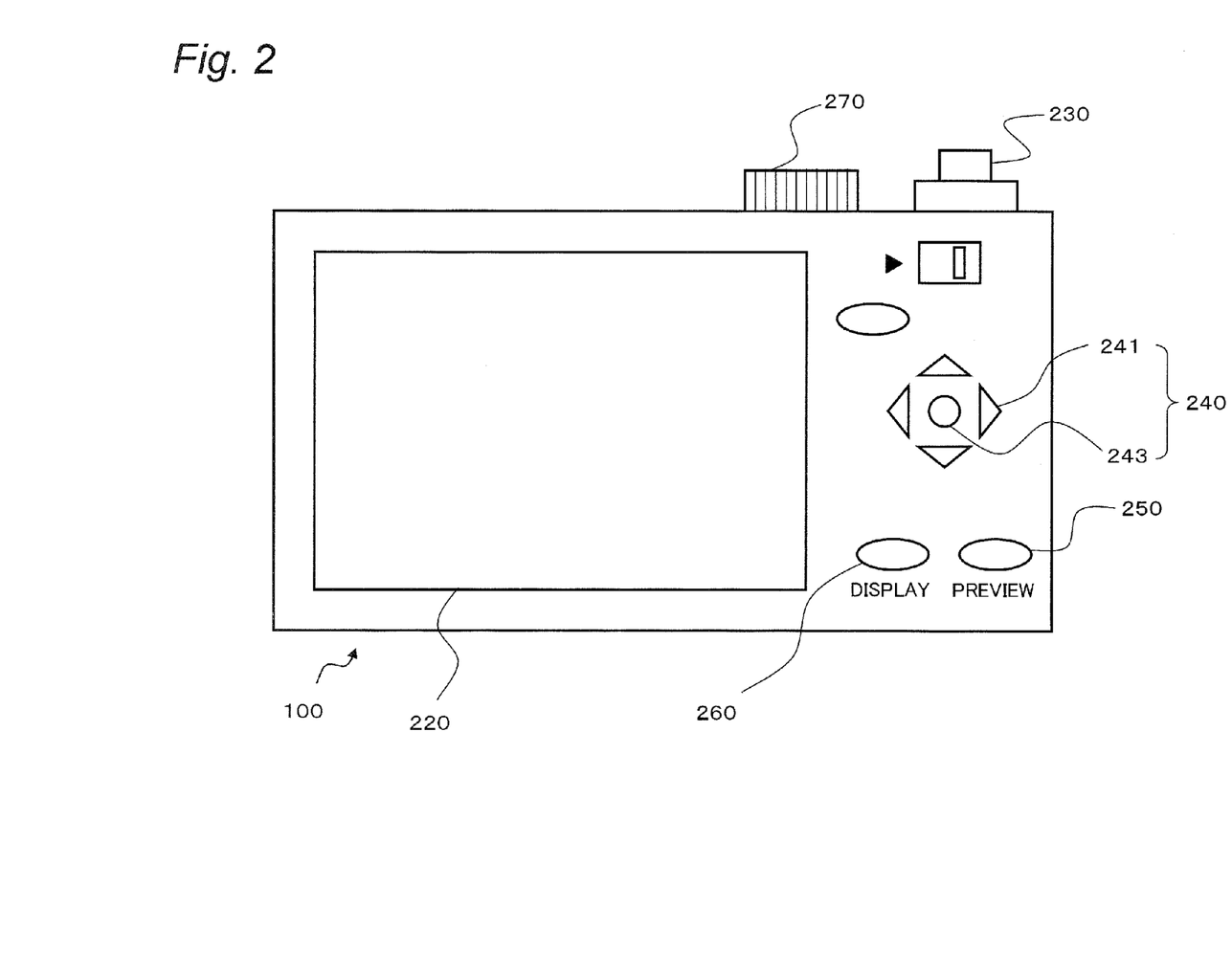
FIG. 2 is a schematic diagram showing a back of the digital camera of the first embodiment.

A back configuration of the digital camera 100 of the first embodiment will be described with reference to FIG. 2, FIG. 2 is a schematic diagram showing the back configuration of the digital camera 100.

The digital camera 100 includes a release button 230 and a shutter speed dial 270 on a top surface. The release button 230 receives half-pressing operation of the user. The user can perform the half-pressing operation of the release button 230 to cause the digital camera 100 to perform autofocus (AF) operation. The shutter speed dial 270 can be rotated. The shutter speed dial 270 is allocated with plural scale markings to which the respective shutter speeds are assigned. The user can set the shutter speed of the digital camera 100 by rotating the shutter speed dial 270.

The digital camera 100 is provided with arrow keys 240, a preview button 250, a display button 260, and the display monitor 220 on a back face. The arrow keys 240 receive pressing operation of the user. The arrow keys 240 include selection buttons 241 disposed vertically and horizontally and a set button 243 disposed in the center. The user can press the selection buttons 241 and 243 to make various selections. The user can determine the selection made by the selection button 241 by pressing the set button 243. The preview button 250 and the display button 260 can be operated by the user pressing the button. The display monitor 220 displays the captured image and a menu screen. The user can perform setting of the diaphragm on the menu screen.

1-3. Operation

With the digital camera 100 of the first embodiment, the user can visually recognize a through image on the display monitor 220. The digital camera 100 can display the through image on the display monitor 220 in either one of a normal mode and a preview mode. Here, the normal mode is a mode in which the through image is always displayed on the display monitor 220 with the same brightness, depth of field, and frame rate irrespective of the settings of the aperture value and shutter speed. In the first embodiment, in the normal mode, a frame rate of the through image is set to 60 (fps), and an imaging interval of the CCD image sensor 140 is set to 60 (sec).

On the other hand, the preview mode is a mode in which the through image of which brightness, depth of field, and frame rate are adjusted based on settings related to exposure made by the user is displayed on the display monitor 220. The settings related to exposure include at least shutter speed, aperture value, or ISO sensitivity. In the preview mode, the aperture value or the shutter speed is adjusted to the setting value, and then an image is actually captured, and the captured image is displayed on the display monitor 220. Therefore, the user can visually recognize an influence of the setting value of the aperture value or shutter speed on the captured image. Thus in the preview mode, the diaphragm 300 and the like are actually adjusted to the setting values, thereby displaying on the display monitor 220 the through image of which brightness and depth of field are adjusted. In short, the image that is actually captured on the condition (such as aperture value and shutter speed) set by the user is displayed on the display monitor 220.

In the first embodiment, the preview mode includes an aperture preview mode and a shutter speed preview mode. In the aperture preview mode, the image that is captured while the diaphragm 300 is actually adjusted to the setting value is displayed. In the shutter speed preview mode, the image that is captured while the diaphragm 300 and the shutter speed are actually adjusted to the setting values is displayed. Operation in the shutter speed preview mode will be described in detail below.

1-3-1. Shutter Speed Preview Mode

Figure 3:
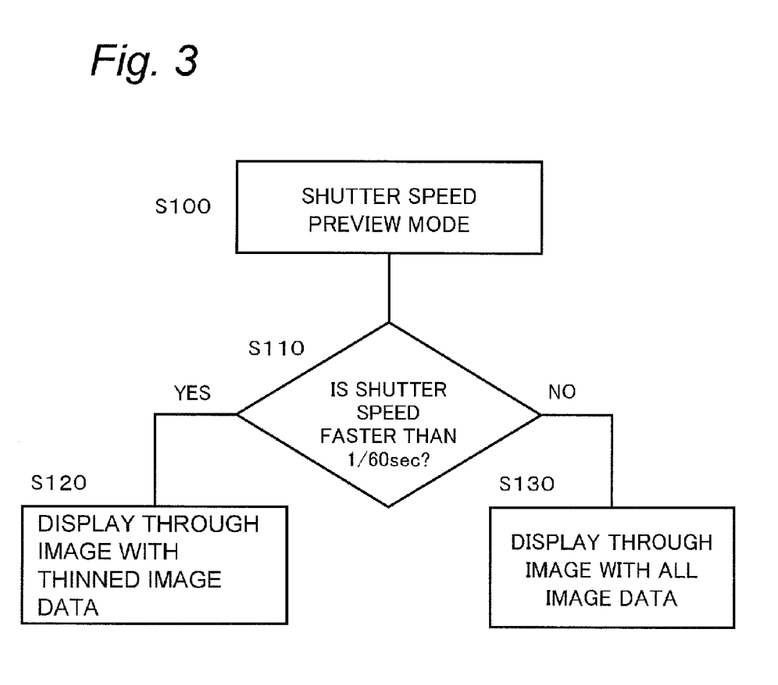
FIG. 3 is a flowchart of a shutter speed preview mode in the digital camera of the first embodiment.
Figure 4A:
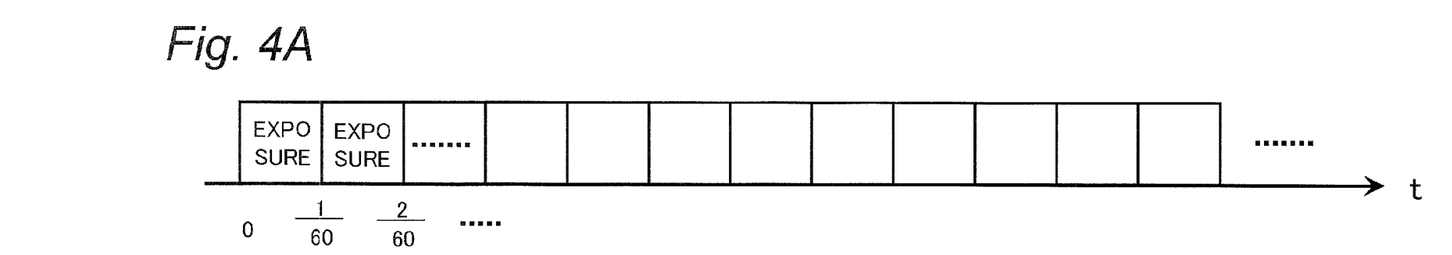
FIGS. 4A to 4C are schematic diagrams for illustrating the shutter speed preview mode in the digital camera of the first embodiment.
Figure 4B:
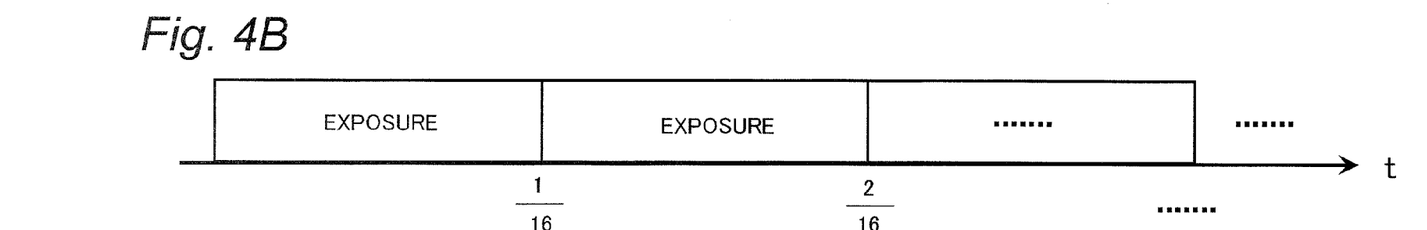
Figure 4C:
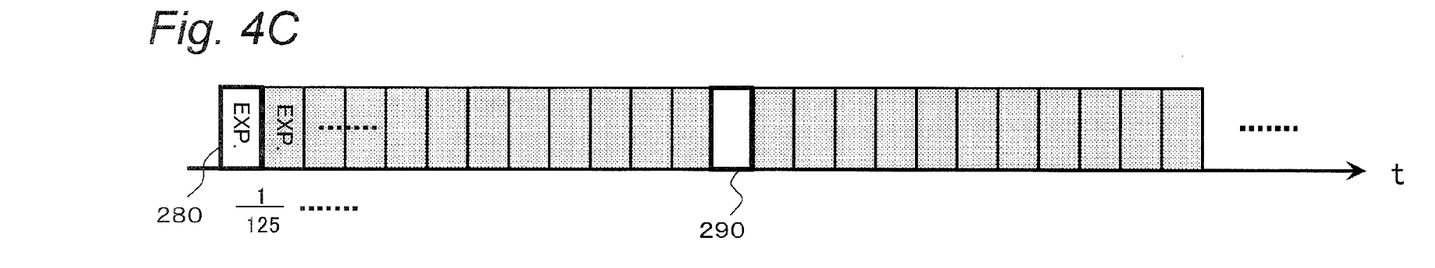

The operation in the shutter speed preview mode will be described with reference to FIGS. 3 and 4A to 4C. FIG. 3 is a flowchart for illustrating the operation in the shutter speed preview mode. FIGS. 4A to 4C are schematic diagrams for illustrating the operation in the shutter speed preview mode.

Referring to FIG. 3, when the user sets a mode on a menu screen displayed on the display monitor 220, the digital camera 100 is set to the shutter speed preview mode (S100). In the shutter speed preview mode, the controller 180 actually adjusts the opening of the diaphragm 300 and the shutter speed of the electrical shutter of the CCD image sensor 140 to the respective setting values, and the image is captured by the CCD image sensor 140 in a condition that the aperture value and the shutter speed are adjusted.

When the shutter speed preview mode is set, the controller 180 of the digital camera 100 determines whether or not the currently set shutter speed is faster than a reference value (S110). In the first embodiment, the reference value is set to $\frac{1}{60}$ (sec). Since the frame rate is set to 60 (fps) for normally displaying the through image in the digital camera 100, the reference value is made matched with a speed corresponding to the frame rate.

The shutter speed set in the digital camera 100 is set based on the settings related to exposure (such as shutter speed, aperture value, and ISO sensitivity) set by the user operation. For example, the shutter speed can be set directly by the user with the shutter speed dial 270. Alternatively, when the aperture value, the ISO sensitivity, and/or various imaging modes are set by the user operation, the controller 180 may automatically set the shutter speed according to the settings. For example, when the user sets the aperture value, the controller 180 may set the shutter speed to a suitable value according to the aperture value.

When determining that the shutter speed is faster than the reference value ($\frac{1}{60}$ (sec)), the controller 180 displays images obtained by thinning out a part of pieces of image data continuously captured by the CCD image sensor 140 as the through image on the display monitor 220 (S120). On the other hand, when determining that the shutter speed is slower than the reference value (1/60 (sec)), the controller 180 displays images of all pieces of image data continuously captured by the CCD image sensor 140 as the through image (S130). The detailed operation will be described below with reference to FIGS. 4A to 4C.

When the through image is displayed in the normal mode, the image data captured with the shutter speed of 1/60 (sec) is sequentially displayed on the display monitor 220 as illustrated in FIG. 4A.

When the set shutter speed is slower than the reference value of 1/60 (sec), as illustrated in FIG. 4B, the controller 180 performs control so that the CCD image sensor 140 is exposed for a time identical to that of the set shutter speed, and all pieces of generated image data are displayed on the display monitor 220. In the example of FIG. 4B, since sixteen images are captured per one second, the substantial frame rate of the image display becomes 16 (fps). Such a displaying method makes the frame rate slower than that of the normal mode, so that the images captured for the exposure time corresponding to the set shutter speed can be displayed continuously on the display monitor 220. As a result, the user can roughly and easily confirm an outcome of the picture generated by taking the subject with the set shutter speed before the picture is actually taken.

On the other hand, when the set shutter speed is faster than the reference value of 1/60 (sec), as illustrated in FIG. 4C, the controller 180 exposes the CCD image sensor 140 for the time corresponding to the set shutter speed. The controller 180 displays only part of plural frames of the generated image data on the display monitor 220. In FIG. 4C, in all pieces of image data generated by the exposure of the CCD image sensor 140, only the image data 280 and the image data 290 except for the hatching image data are displayed on the display monitor 220. In FIG. 4C, a ratio of the number of pieces of captured image data to the number of pieces of actually displayed image data is 12:1, and thus the substantial frame rate of the image display is about 10 (fps).

In this manner the frame rate during the display is slower than that of the normal mode, and thus the images appearing to stop momentarily can be displayed continuously on the display monitor 220 for the image captured with the high shutter speed, so that the user can easily visually recognize the image content. As a result, the user can roughly and easily confirm the outcome of the picture generated by the subject with the set shutter speed before the picture is actually taken.

Thus, in the shutter speed preview mode, the ratio of the number of images captured by the CCD image sensor 140 and the number of actually displayed images per unit time is changed according to the set shutter speed. Specifically, the ratio of the number of captured images and the number of actually displayed images is set to 1:1 when the set shutter speed is equal to or slower than the reference value, and the ratio is set to a predetermined value (>1): 1 when the set shutter speed is faster than the reference value.

1-3-2. Transition Between Normal Mode and Preview Mode

Figure 5:
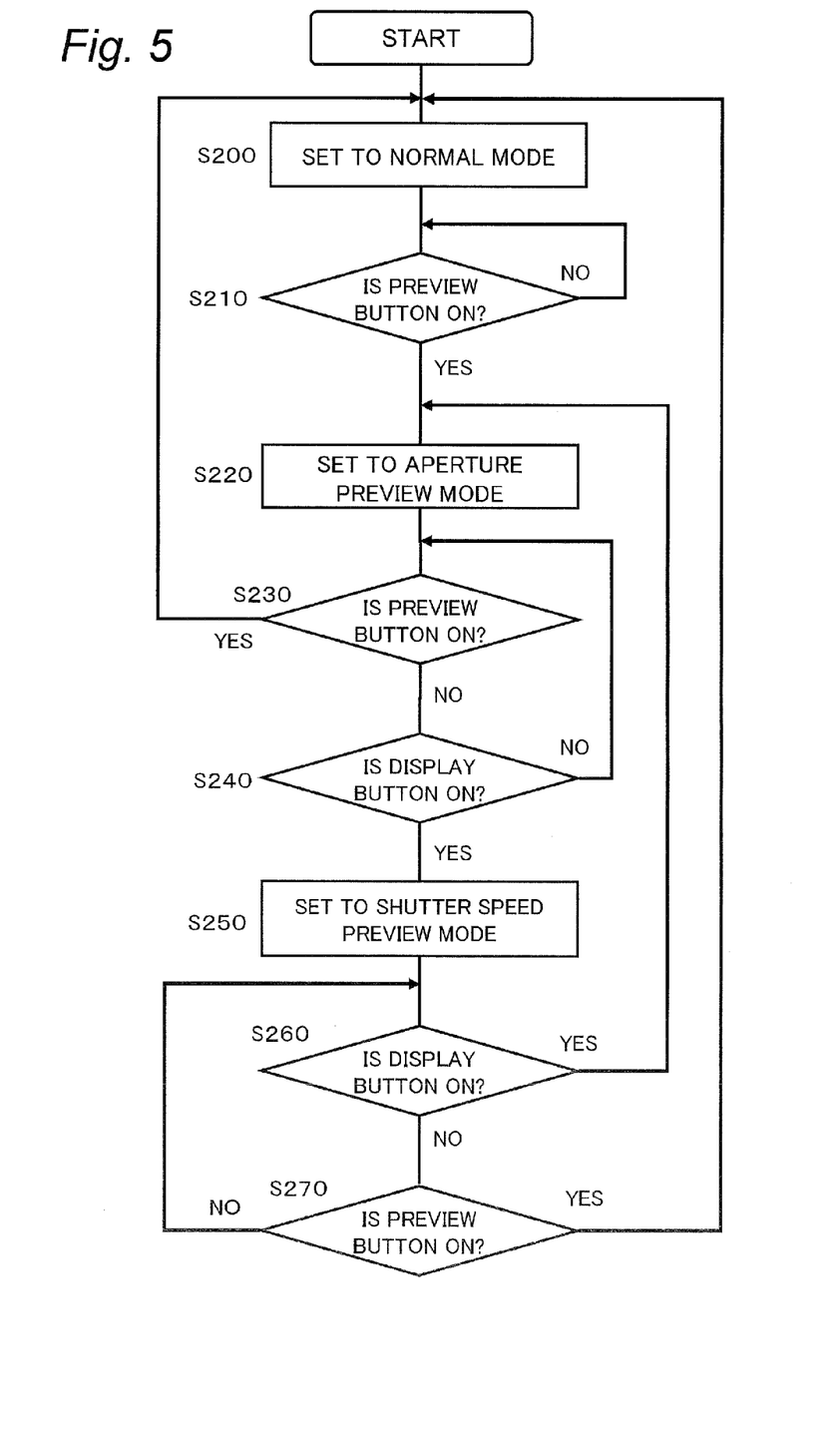
FIG. 5 is a flowchart for illustrating a transition to the shutter speed preview mode in the digital camera of the first embodiment.

A transition between the normal mode and the preview mode will be described with reference to FIG. 5. FIG. 5 is a flowchart for illustrating the transition between the normal mode and the preview mode. In the first embodiment, the preview button 250 switches the normal mode and the preview mode. Further, in the preview mode, the display button 260 switches the aperture preview mode and the shutter speed preview mode.

Referring to FIG. 5, the user can operate the operational section 210 to set the digital camera 100 to the normal mode (S200). When the digital camera 100 is set to the normal mode, the controller 180 determines whether or not the preview button 250 is pressed (S210).

When determining that the preview button 250 is pressed, the controller 180 sets the digital camera 100 to the aperture preview mode to adjust the aperture value of the diaphragm 300 to the set aperture value (S220).

After adjustment of the aperture value of the diaphragm 300, the controller 180 determines whether or not the user presses the preview button 250 again (S230). When determining that the user presses the preview button 250 again, the controller 180 controls the digital camera 100 to leave from the aperture preview mode and shift to the normal mode. On the other hand, when determining that the user does not press the preview button 250 again, the controller 180 determines whether or not the display button 260 is pressed (S240).

When determining that the display button 260 is pressed, the digital camera 100 is controlled to shift to the shutter speed preview mode (S250). When the digital camera 100 shifts to the shutter speed preview mode, the controller 180 determines whether or not the display button 260 is pressed again (S260).

When determining that the display button 260 is pressed again, the controller 180 controls the digital camera 100 to leave from the shutter speed preview mode and enter the aperture preview mode. On the other hand, when determining that the display button 260 is not pressed, the controller 180 determines whether or not the preview button 250 is pressed (S270).

When determining that the preview button 250 is pressed, the controller 180 controls the digital camera 100 to leave from the shutter speed preview mode and enter the normal mode. In this manner, the digital camera 100 of the first embodiment has the configuration which enables return from the shutter speed preview mode to the normal mode quickly by one-touch operation of pressing the preview button 250. This configuration allows the user to return easily the digital camera 100 to the normal mode.

The digital camera 100 of the first embodiment adjusts not only the shutter speed but also the aperture value to the respective setting value when being set to the shutter speed preview mode. However, this arrangement is not always necessary. For example, in the shutter speed preview mode, only the shutter speed may be adjusted to the setting value.

In the digital camera 100 of the first embodiment, the moving image is displayed with the frame rate of 60 (fps) in the normal mode. However, this arrangement is not always necessary. For example, the through image may be displayed with the frame rate of 30 (fps) or 24 (fps). In such a case, the reference value that is used to determine whether or not the images are thinned in the shutter speed preview mode may be set to 1/30 (sec) or 1/24 (sec), thus resulting in the same effect as described above.

In the first embodiment, a determination whether the images are thinned in the shutter speed preview mode is made with the reference value set to 1/60 (sec). However, the reference value is not limited to 1/60 (sec), but may be set to another value, for example, 1/30 (sec).

In the first embodiment, the controller 180 controls the digital camera 100 which is set to one of preview modes, to leave from the preview mode and enter the normal mode when receiving the half-press operation of the release button 230, and controls the lens driver 120 to perform the autofocus operation. Thus, in each preview mode, the user can rapidly start to take a picture, preventing loss of the shutter chance.

1-4. Summary of First Embodiment

The digital camera 100 of the first embodiment includes the CCD image sensor 140 that is exposed to generate image data, the display monitor 220 that can display the moving image based on the image data generated by the CCD image sensor 140, the operational section 210 that receives the setting of the user, the shutter 130 that adjusts the exposure time of the CCD image sensor 140 according to the shutter speed, the controller 180 that determines the shutter speed according to the setting related to exposure set by the user through the operational section 210, and the controller 180 that controls the CCD image sensor 140 and the display monitor 220 according to the shutter speed determined by the controller 180. The controller 180 changes the frame rate of the moving image display in the display monitor 220 according to the determined shutter speed.

Hence, the user can roughly confirm the outcome of the picture generated by taking the subject with the set shutter speed before the picture is actually taken.

The controller 180 changes the frame rate of the moving image display by switching the control in which part of the pieces of image data continuously generated by the CCD image sensor 140 is displayed on the display monitor 220 and the control in which all the pieces of image data continuously generated are displayed on the display monitor 220.

Hence, the user can roughly confirm the outcome of the picture generated by taking the subject with the set shutter speed before the picture is actually taken.

The controller 180 controls the display monitor 220 to display the moving image based on part of the pieces of image data continuously generated by the CCD image sensor 140, when the determined shutter speed is faster than the predetermined reference value. The display monitor 220 can usually display the moving image with a predetermined frame rate, and the predetermined reference value is a value corresponding to a time required for displaying one frame with the predetermined frame rate of the display monitor 220.

Hence, for the image captured with the high shutter speed, the images appearing to stop momentarily can be continuously displayed on the display monitor 220. As a result, the user can roughly confirm the outcome of the picture generated by taking the subject with the set shutter speed before the picture is actually taken.

The controller 180 controls the display monitor 220 to display the moving image based on all pieces of image data continuously generated by the CCD image sensor 140, when the determined shutter speed is slower than the predetermined reference value.

Hence, the user can roughly confirm the outcome of the picture generated by taking the subject with the set shutter speed before the picture is actually taken.

The digital camera 100 of the first embodiment includes a normal mode in which the moving image is displayed on the display monitor 220 at a predetermined frame rate, and a preview mode in which the frame rate of the moving image display is changed in the display monitor 220 according to the shutter speed determined by the controller 180.

In the preview mode, the user can roughly confirm the outcome of the picture generated by tanking the subject with the set shutter speed before the picture is actually taken.

2. Second Embodiment

A digital camera according to a second embodiment will be described. The configuration of the digital camera of the second embodiment is similar to that of FIG. 1. The configuration, elements and operations which are not described below are same as those described in the first embodiment. The digital camera of the second embodiment changes the frame rate of displaying the moving image in the preview mode by switching an imaging period of the CCD image sensor 140.

2-1. Operation

2-1-1. Shutter Speed Preview Mode

Figure 6A:
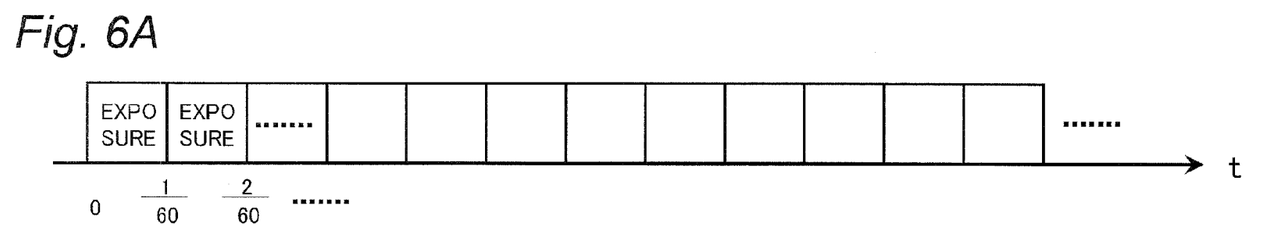
FIGS. 6A to 6C are schematic diagrams for illustrating a shutter speed preview mode in a digital camera according to a second embodiment.
Figure 6B:
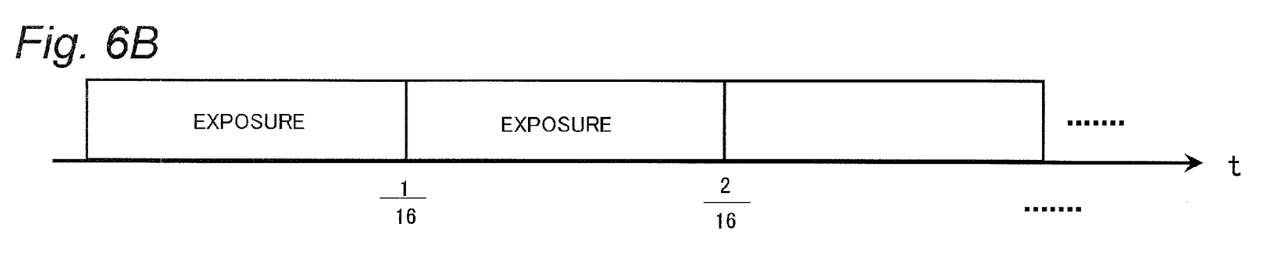
Figure 6C:
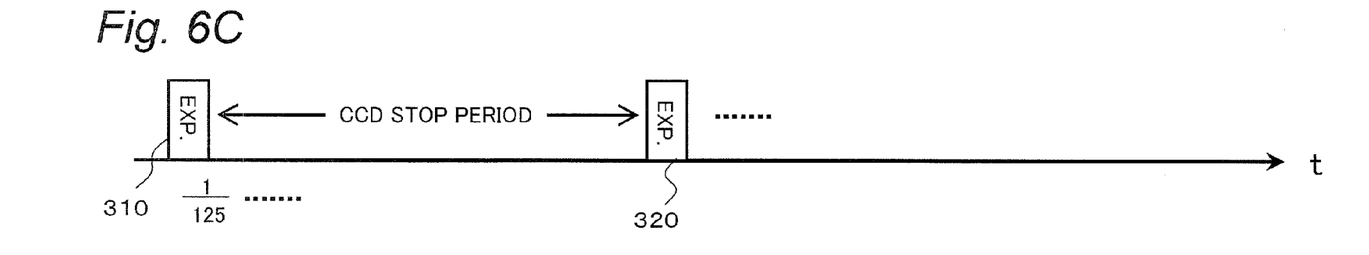

A shutter speed preview mode in the second embodiment will be described with reference to FIGS. 6A to 6C. FIGS. 6A to 6C are schematic diagrams for illustrating the shutter speed preview mode of the second embodiment.

In the shutter speed preview mode of the second embodiment, control different from that of the first embodiment is performed when the shutter speed is set faster than the reference value (in this case, 1/60 (sec)).

In the digital camera 100 of the second embodiment, the operations are similar to those of the first embodiment when the shutter speed is equal to or slower than the reference value (1/60 (sec)) (see FIGS. 6A and 6B).

When the shutter speed is faster than the reference value (1/60 (sec)), as illustrated in FIG. 6C, images 310 and 320 are captured with the set shutter speed at a constant time interval, and all the images 310 and 320 are displayed on the display monitor 220 (without thinning the images). In the second embodiment, the CCD image sensor 140 is stopped at a timing in which no image is required to be displayed on the display monitor 220. Thus, the frame rate of the moving image displayed on the display monitor 220 is changed by stopping the CCD image sensor 140 for the constant period.

In the second embodiment, no image is captured by the CCD image sensor 140 when the display is not required, so that power consumption can be reduced in the digital camera 100.

2-2. Summary of Second Embodiment

The digital camera 100 of the second embodiment includes the CCD image sensor 140 that is exposed to generate image data, the display monitor 220 that can display the moving image based on the image data generated by the CCD image sensor 140, the operational section 210 that receives the setting of the user, the shutter 130 that adjusts the exposure time of the CCD image sensor 140 according to the shutter speed, the controller 180 that determines the shutter speed according to the setting related to exposure set by the user through the operational section 210, and the controller 180 that controls the CCD image sensor 140 and the display monitor 220 according to the shutter speed determined by the controller 180. The controller 180 changes the frame rate of displaying the moving image on the display monitor 220 according to the determined shutter speed. The controller 180 changes the frame rate by switching the control for controlling the CCD image sensor 140 to be continuously exposed to continuously generate plural pieces of image data and the control for controlling the CCD image sensor 140 to be intermittently exposed with the stop interval of the CCD image sensor 140 to intermittently generate the plural pieces of image data.

Hence, the user can roughly confirm the outcome of the picture generated by taking the subject with the set shutter speed before the picture is actually taken. Further, the power consumption can be reduced in the CCD image sensor 140, saving the power in the whole of the digital camera.

3. Other Embodiments

Although the imaging apparatuses of the first and second embodiments are described above, the embodiment is not limited to the embodiments. Other embodiment will be described below.

The imaging apparatuses of the first and second embodiments use a focal-plane shutter as the shutter. However, the shutter is not limited to the focal-plane shutter. For example, a lens shutter may be used as the shutter.

The imaging apparatuses of the first and second embodiments are configured to shift to the shutter speed preview mode by being pressed with the preview button and the display button. However, it is not limited to such a configuration. For example, the imaging apparatus may be configured to automatically shift to the shutter speed preview mode when being set to the shutter speed priority mode or the manual mode in which the shutter speed is set by the user. Hence, when the user intentionally sets the shutter speed, the user can always confirm what picture is taken with the currently set shutter speed.

The optical system and driver system of the imaging apparatus to which the concept of the embodiments are applied are not limited to those of FIG. 1. For example, although the optical system having three-group configuration is illustrated in FIG. 1, another lens configuration may be adopted. Each lens may include one lens or a lens group containing plural lenses.

In the first embodiment, the CCD image sensor 140 is used as the imaging unit. However, the imaging unit is not limited to the CCD image sensor 140. For example, the imaging unit may include a CMOS image sensor or an NMOS image sensor.

The image processor 160 and the controller 180 may be integrated in one semiconductor chip or may be formed in separate semiconductor chips.

INDUSTRIAL APPLICABILITY

The embodiments can be applied to an imaging apparatus such as a digital still camera and a digital video camera.

What is claimed is:

1. An imaging apparatus comprising:
    an imaging unit exposed to generate image data;
    a display unit displaying, as a through image, a moving image based on the image data generated by the imaging unit;
    a setting unit receiving setting of a user;
    a shutter adjusting an exposure time of the imaging unit according to a shutter speed;
    a determination unit determining the shutter speed according to setting related to exposure set by the user through the setting unit; and
    a controller controlling the imaging unit and the display unit, wherein the controller controls the imaging unit to be exposed for an exposure time corresponding to the shutter speed determined by the determination unit, and changes a frame rate of displaying, as the through image, the moving image on the display unit according to the determined shutter speed by switching a control in which a part of pieces of image data continuously generated by the imaging unit is displayed on the display unit and a control in which all pieces of image data continuously generated are displayed on the display unit.

2. The imaging apparatus according to claim 1, wherein the controller controls the display unit to display the moving image based on the part of pieces of image data continuously generated by the imaging unit, when the shutter speed determined by the determination unit is faster than a predetermined reference value.

3. The imaging apparatus according to claim 2, wherein the display unit can display the moving image with a predetermined frame rate, and the predetermined reference value is a value corresponding to a time required for displaying one frame with the predetermined frame rate.

4. The imaging apparatus according to claim 1, wherein the controller controls the display unit to display the moving image based on all pieces of image data continuously generated by the imaging unit, when the shutter speed determined by the determination unit is slower than a predetermined reference value.

5. The imaging apparatus according to claim 4, wherein the display unit can display the moving image with a predetermined frame rate, and the predetermined reference value is a value corresponding to a time required for displaying one frame with the predetermined frame rate.

6. The imaging apparatus according to claim 1, wherein the display unit displays the moving image by continuously displaying all or a part of pieces of image data actually generated by the imaging unit.

7. The imaging apparatus according to claim 1, wherein the setting related to exposure includes at least aperture value, shutter speed, or ISO sensitivity.

8. The imaging apparatus according to claim 1, comprising:
    a first display mode in which the moving image is displayed on the display unit at a predetermined frame rate; and
    a second display mode in which the frame rate of displaying the moving image in the display unit is changed according to the shutter speed determined by the determination unit.

* * * * *